US007122153B2

(12) United States Patent
Ho

(10) Patent No.: US 7,122,153 B2
(45) Date of Patent: Oct. 17, 2006

(54) SELF-CONTAINED MICROFLUIDIC BIOCHIP AND APPARATUS

(76) Inventor: Winston Z. Ho, 10020 Pioneer Blvd., Suite 103, Hacienda Heights, CA (US) 90670

( * ) Notice: Subject to any disclaimer, the term of this patent is extended or adjusted under 35 U.S.C. 154(b) by 660 days.

(21) Appl. No.: 10/338,451

(22) Filed: Jan. 8, 2003

(65) Prior Publication Data

US 2004/0132218 A1 Jul. 8, 2004

(51) Int. Cl.
*G01N 21/00* (2006.01)

(52) U.S. Cl. ............................ 422/58; 422/55; 422/57; 436/5; 436/6

(58) Field of Classification Search .................. 422/55, 422/57, 58; 436/6, 5
See application file for complete search history.

(56) References Cited

U.S. PATENT DOCUMENTS

| | | | | |
|---|---|---|---|---|
| 4,264,560 | A * | 4/1981 | Natelson | 422/58 |
| 4,426,451 | A | 1/1984 | Columbus | |
| 4,690,899 | A | 9/1987 | Klose et al. | |
| 4,710,472 | A | 12/1987 | Saur | |
| 5,096,669 | A | 3/1992 | Lauks et al. | |
| 5,164,598 | A | 11/1992 | Hillman et al. | |
| 5,229,297 | A | 7/1993 | Schnipelsky et al. | |
| 5,382,512 | A * | 1/1995 | Smethers et al. | 435/6 |
| 6,018,387 | A | 1/2000 | Eppler et al. | |
| 6,150,180 | A * | 11/2000 | Parce et al. | 436/514 |
| 6,167,910 | B1 * | 1/2001 | Chow | 137/827 |
| 6,186,660 | B1 | 2/2001 | Kopf-Sill | |
| 6,187,267 | B1 | 2/2001 | Taylor et al. | |
| 6,238,538 | B1 | 5/2001 | Parce et al. | |
| 6,242,246 | B1 | 6/2001 | Gold et al. | |
| 6,268,219 | B1 | 7/2001 | McBride | |
| 6,270,641 | B1 | 8/2001 | Griffiths | |
| 6,271,042 | B1 | 8/2001 | Watson, Jr. et al. | |
| 6,300,138 | B1 | 10/2001 | Gleason et al. | |
| 6,429,025 | B1 | 8/2002 | Parce et al. | |
| 6,485,918 | B1 * | 11/2002 | Schermer et al. | 435/6 |
| 6,488,896 | B1 * | 12/2002 | Weigl et al. | 422/101 |
| 2002/0124879 | A1 | 9/2002 | Kaplan et al. | |
| 2002/0187560 | A1 | 12/2002 | Pezzuto et al. | |

FOREIGN PATENT DOCUMENTS

| | | | |
|---|---|---|---|
| DE | 19858443 | A1 | 7/2000 |
| EP | 1203959 | A1 | 5/2002 |

OTHER PUBLICATIONS

International Search Report of Counterpart PCT Application No. PCT/US04/00768.

Stanley Abramowitz, "DNA Analysis in Microfabricated Formats", Journal of Biomedical Microdevices, 1:2, 107-112 (1999).

(Continued)

*Primary Examiner*—Jill Warden
*Assistant Examiner*—Neil Turk
(74) *Attorney, Agent, or Firm*—Liu & Liu

(57) ABSTRACT

A biochip and apparatus is disclosed for performing biological assays in a self-contained microfluidic platform. The disposable biochip for multi-step reactions comprises a body structure with a plurality of reagent cavities and reaction wells connected via microfluidic channels; the reagent cavities with reagent sealing means for storing a plurality of reagents; the reagent sealing means being breakable and allowing a sequence of reagents to be released into microfluidic channel and reaction well; and the reaction well allowing multi-step reactions to occur by sequentially removing away the residual reagents. The analysis apparatus can rapidly, automatically, sensitively, and simultaneously detect and identify multiple analytes or multiple samples in a very small quantity.

18 Claims, 4 Drawing Sheets

OTHER PUBLICATIONS

Mark J. Feldstein, et al., "Array Biosensor: Optical and Fluidics Systems", Journal of Biomedical Microdevices, 1:2. 139-153 (1999).

Irina Kleps, et al., New Micro- and Nanoelectrode Arrays for Biomedical Applications, Journal of Biomedical Microdevices, 3:1, 29-33 (2001).

* cited by examiner

SELF-CONTAINED MICROFLUIDIC BIOCHIP AND APPARATUS

FIELD OF THE INVENTION

The invention is related to a self-contained biochip that is preloaded with necessary reagents, and utilizes microfluidic mechanism to perform biological reactions and assays. The biochip analysis apparatus can rapidly and automatically measure the quantities of chemical and biological species in a sample.

BACKGROUND OF THE INVENTION

Current hospital and clinical laboratories are facilitated with highly sophisticate and automated systems with the capability to run up to several thousand samples per day. These high throughput systems have automatic robotic arms, pumps, tubes, reservoirs, and conveying belts to sequentially move tubes to proper position, deliver the reagents from storage reservoirs to test tubes, perform mixing, pump out the solutions to waste bottles, and transport the tubes on a conveyer to various modules. Typically three to five bottles of about 1 gallon per bottle of reagent solutions are required. While the systems are well proved and accepted in a laboratory, they are either located far from the patients or only operated once large samples have been collected. Thus, it often takes hours or even days for a patient to know their test results. These systems are very expensive to acquire and operate and too large to be used in point-of-care testing setting.

The biochips offer the possibility to rapidly and easily perform multiple biological and chemical tests using very small volume of reagents in a very small platform. In the biochip platform, there are a couple of ways to deliver reagent solutions to reaction sites. The first approach is to use external pumps and tubes to transfer reagents from external reservoirs. The method provides high throughput capability, but connecting external macroscopic tubes to microscopic microchannel of a biochip is challenging and troublesome. The other approach is to use on-chip or off-chip electromechanical mechanisms to transfer self-contained or preloaded reagents on the chips to sensing sites. While on-chip electromechanical device is very attractive, fabricating micro components on a chip is still very costly, especially for disposable chips. On the other hand, the off-chip electromechanical components, facilitated in an analysis apparatus, that are able to operate continuously for a long period of time is most suited for disposable biochip applications.

The microfluidics-based biochips have broad application in fields of biotechnology, molecular biology, and clinical diagnostics. The self-contained biochip, configured and adapted for insertion into an analysis apparatus, provides the advantages of compact integration, ready for use, simple operation, and rapid testing. For microfluidic biochip inanufactirers, however, there are two daunting challenges. One of the challenges is to store reagents without losing their volumes over product shelf life. The storage cavity should have a highly reliable sealing means to ensure no leak of reagent liquid and vapor. Although many microscale gates and valves are commercially available to control the flow and prohibit liquid leakage before use, they are usually not hermetic seal for the vaporized gas molecules. Vapor can diffuse from cavity into microchannel network, and lead to reagent loss and cross contamination. The second challenge is to deliver a very small amount of reagents to a reaction site for quantitative assay. The common problems associated are air bubbles and dead volume in the inicrochannel system. An air bubble forms when a small channel is merged with a large channel or large reaction area, or vice versa. Pressure drops cause bubble formation. The air bubble or dead volume in the microfluidic channel can easily result in unacceptable error for biological assay or clinical diagnosis.

Several prior art devices have been described for the performance of a number of microfluidics-based biochip and analytical systems. U.S. Pat. No. 5,096,669 discloses a disposable sensing device with special sample collection means for real time fluid analysis. The cartridge is designed for one-step electrical conductivity measurement with a pair of electrodes, and is not designed for multi-step reaction applications. U.S. Pat. No. 6,238,538 to Caliper Technologies Corp. discloses a method of using electro-osmotic force to control fluid movement. The microfabricated substrates are not used for reagent storage. U.S. Pat. No. 6,429,025 discloses a biochip body structure comprising at least two intersecting microchannels, which source is coupled to the least one of the two microchannels via a capillary or microchannel. Although many prior art patents are related to microfluidic platform, none of them discloses liquid sealed mechanism for self-contained biochips. They are generally not designed for multi-step reactions application.

SUMMARY OF THE INVENTION

In accordance with preferred embodiments of the present invention, a self-contained microfluidic disposable biochip is provided for performing a variety of chemical and biological analyses. The disposable biochip is constructed with the ability of easy implementation and storage of necessary reagents over the reagent product shelf life without loss of volume.

Another object of this invention is to provide a ready to use, highly sensitive and reliable biochip. Loading a sample and inserting it into a reading apparatus are the only necessary procedures. All the commercially available point of care testing (POCT) analyzers have poor sensitivity and reliability in comparison with the large laboratory systems. The key problem associated with a POCT is the variation in each step of reagent delivery during multiple-step reactions. Especially, the problems are occurred in closed confinement. For example, a common sandwiched immunoassay, three to six reaction steps are required depending on the assay protocol and washing process. Each reaction requires accurate and repeatable fluids volume delivery.

Another object of this invention is to provide the ability of a biochip with the flexibility for performing a variety of multi-step chemical and biological measurements. The disposable biochip is configured and constructed to have the number of reagent cavities matching the number of assay reagents, and the analysis apparatus performs multiple reactions, one by one, according to the assay protocol.

Another object of this invention is to provide a biochip that can perform multianalyte and multi-sample tests simultaneously. A network of microfluidic channel offers the ability to process multiple samples or multiple analytes in parallel.

Another object of this invention is to mitigate the problems associated with air bubble and dead volume in the microchannel. The air bubble or dead volume in the microfluidic channel easily results in unacceptable error for biological assay or clinical diagnosis. This invention is based on a microfluidic system with a reaction well, which has an open volume structure and eliminates the common microfluidic problems.

The present invention with preloaded biochips has the advantages of simple and easy operation. The resulting analysis apparatus provides accurate and repeatable results. It should be understood, however, that the detail description and specific examples, while indicating preferred embodiments of the present invention, are given by way of illustration and not of limitation. Further, as is will become apparent to those skilled in the area, the teaching of the present invention can be applied to devices for measuring the concentration of a variety of liquid samples.

DETAILED DESCRIPTION OF EMBODIMENTS OF THE INVENTION

Figure 1:
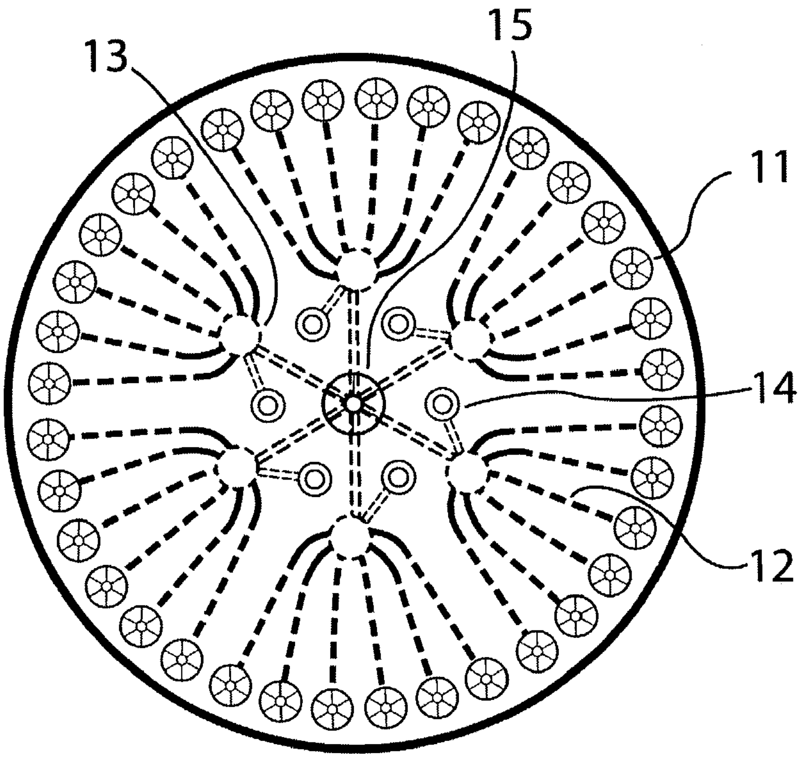
FIG. 1 is a top view of a self-contained biochip with microfluidic channel connecting reagent cavities and reaction wells.
Figure 2:
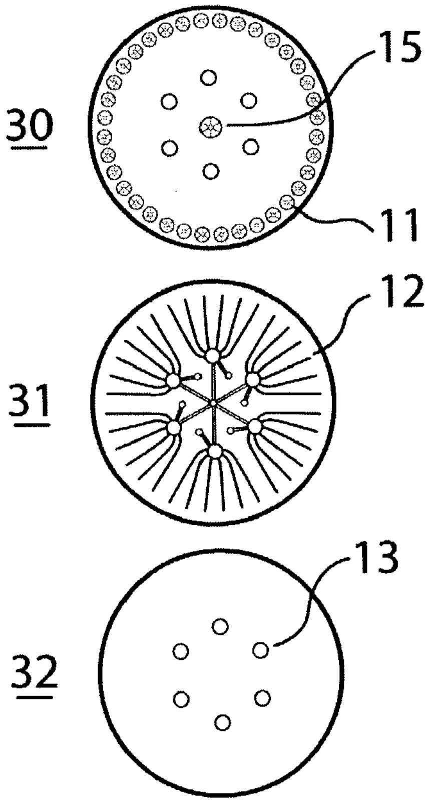
FIG. 2. is a top view of the a reagent layer, a microchannel layer, and a reaction well layer of the multi-layer structure of the biochip.
Figure 3:
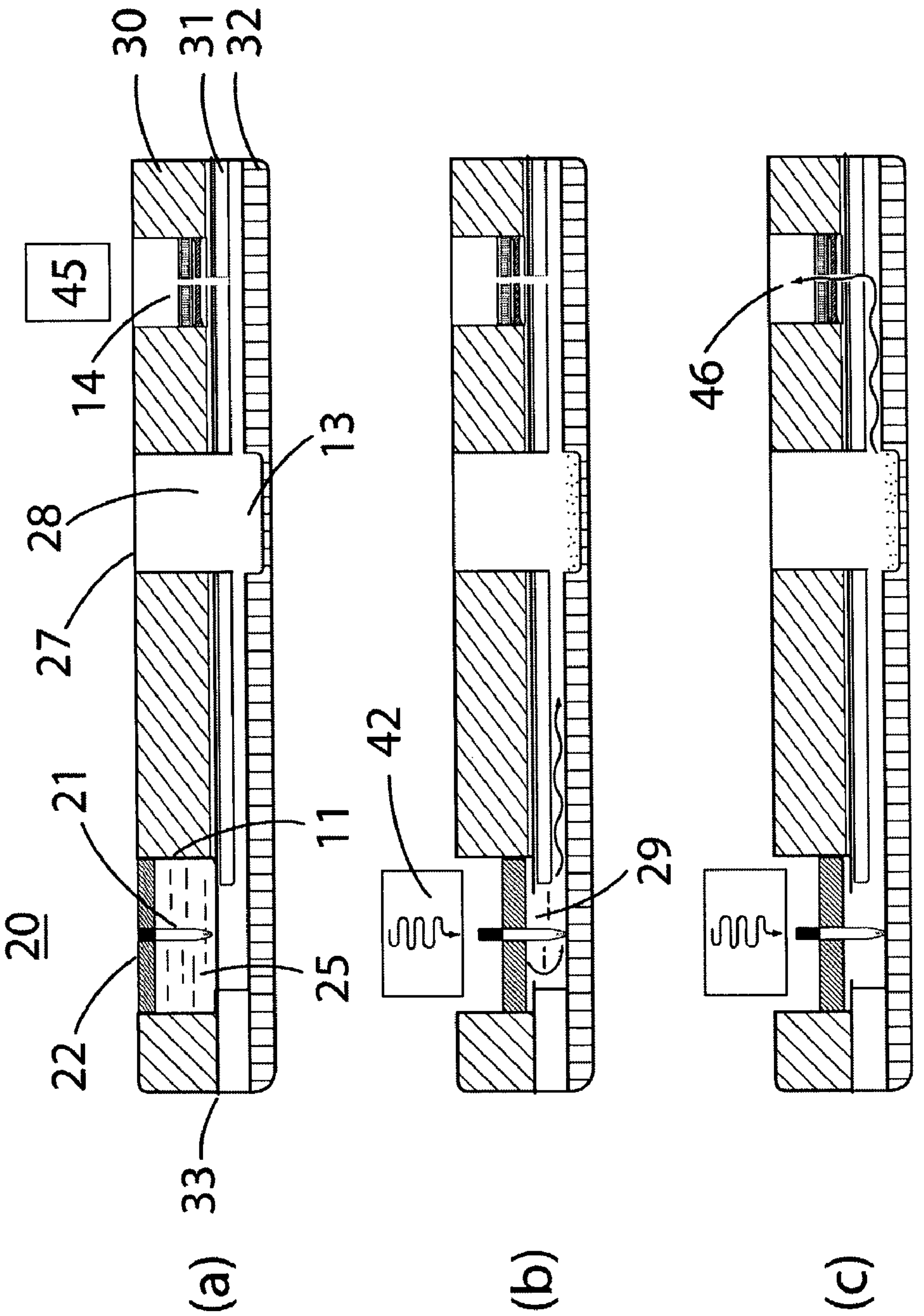
FIG. 3 is the cross section view of the chip with micro cap assembly and microfuidic channel. (a) Before and (b) after the reagent is released from the reagent cavity and into microfluidic channels and reaction wells driven by a microactuator. The micro cap assembly with a stopper and a pin is designed to reliably pierce the sealing thin film and open the cavity; (c) The residual reagent in the reaction well is withdrawn via the waste port by a vacuum line.

The pattern of the self-contained microfluidic biochip is designed according to the need of the assay and protocol. For example, the chip (FIG. 1) consists of 6 sets of microfluidic pattern; it depends on the number of analyte and on-chip controls. Bach set includes multiple (6) reagent cavities 11, a reaction well 13, a waste port 14, and a network of microfluidic channel 12. The sample can be delivered into individual reaction wells directly or via a main sample port 15 for equal distribution. The biochip body structure comprises a plurality of reagent cavities and reaction wells via microchannels. The chip has a three-layer composition: (shown. in FIG. 2) (a) the top layer is a reagent layer 30, (b) the middle layer is a microchannel layer 31, and (c) the bottom layer is a reaction well layer 32. The reagent cavities 11 formed in the reagent layer 30 allow for the storage of various reagents or buffer solutions. The microchannel layer contains a network of microfluidic channels 12 are patterned on the bottom. side of the layer. The microchannel layer and the reaction well layer form microfluidic channels, which connect the reagent cavities to reaction wells and to the waste port. The reaction well layer has a number of mnicrowells, which are able to hold sufficient volume of samples or reagents for reactions. Reagent sealing means (shown in FIG. 3), which includes a thin film 33 located at The bottom of the reagent cavity and a micro cap assembly 20 located at the top of the cavity, confines the reagent 25 in the reagent cavity. The thin film is breakable and is adhered to the reagent layer and the microchannel layer. The microchannel layer and reaction well layer is bonded by either chemical or physical methods.

The microfluidic biochip can be fabricated by soft lithography with polydimethyl siloxane (PDMS) or micro machining on plastic materials. PDMS-based chips, due to small lithographic depths, have volume limitations (<5 μl). When clinical reagents on the order of 5 μl to 500 μl, the layers are fabricated by micro machining plastic materials. The dimension of the reagent cavity could be easily scaled upward to hold sufficient volumes of clinical samples or reagents. Soft lithography is best suited for microfabrication with a high density of microfluidic channels. But its softness properties and long-term stability remain a problem for clinical products. Therefore, the chip is preferably fabricated by micro machining on plastic materials. The dimension of a microfluidic channel is on the order of 5 μm-2 mm. The plastic chips are made by multi-layer polystyrene and polyacrylic. Micro machining chips can scale up the cavity dimension easily. It can be mass-produced by injection mold as a disposable chip.

The chip is placed on a rotational stage, which positions a specific reagent cavity under a microactuator 42. All reagents are pre-sealed or pre-capped in reagent cavities. The micro cap assembly is fabricated inside the reagent cavity to perform both capping and piercing. A pressure-driven microactuator controls the microfluidic kinetics. The micro cap assembly has two plastic pieces: a pin 21 and a stopper 22. In the operation, the actuator engages with the assembly, it pushes the element downward. The pin pierces through the thin film and opens the cavity. Then, the stopper is depressed downward to the bottom of the well. The stopper stays at the bottom of the well to prevent backflow. By this method, the micro cap assembly opens the cavity as a valve 29 and let the reagent flow into the microfluidic channel. The configuration also prevent causing internal pressure build-up. The microactuator works like a plastic micro plunger or syringe, is simple, rugged, and reliable. The movement of fluid is physically constrained to exit only through the microchannel and to the reaction well. A single actuator can manage a whole circle of reagent cavities.

After delivering the sample into the sample port or into one of the reaction well through a rubber cap 27, the system sequentially delivers reagents one at a time into the reaction well and incubates for a certain time. There is a large volume of air space 28 above the reaction well. With this design, air is allowed into the microfluidic system. No bubble is trapped in the microfluidic channel system. In practice, the actuator can also utilize the spare air in the reagent cavity to displace all of the residual liquid left in the microchannel into the reaction well, where there is plenty of air space. Therefore, the common problems associated with microfluidic systems, such as air bubbles, dead volumes, inhomogeneous distribution, and residual liquid left in the microfluidic channel, will not occur or affect the outcome of the test results. After the reaction, the residual reagent is removed away to an on-chip or off-chip waste reservoir. A vacuum line 45 is situated atop the waste port 14 via a vented hole 46 to withdraw small volume of liquid from the reaction well.

Figure 4:
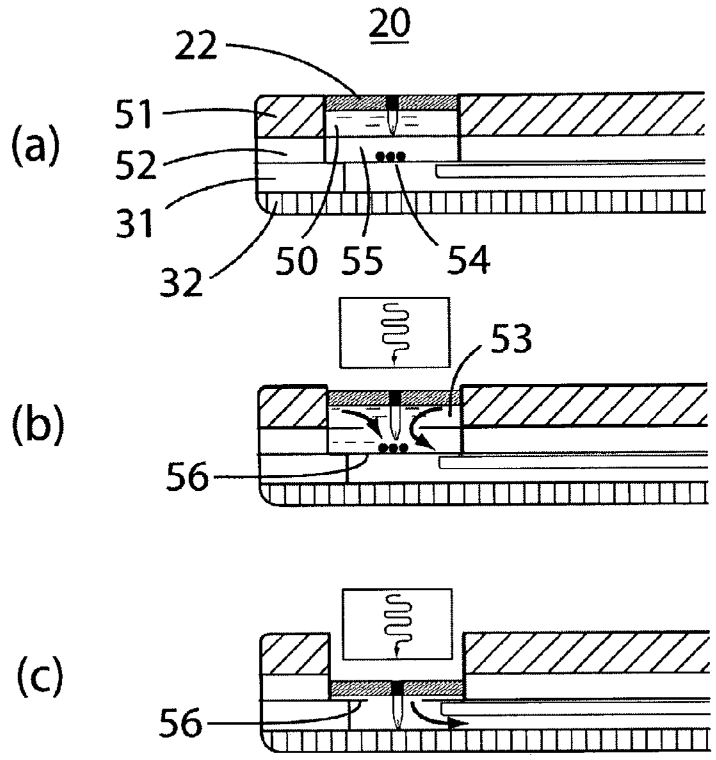
FIG. 4 is the cross section view of the self-contained biochip with a four-layer structure for dry reagent. The sequence of operations are: (a) The buffer solution and dry reagents are sealed in the separate cavities; (b) The first thin film is pierced, and the reagent buffer is moved into the dry reagent cavity and dissolves the dry reagent; and (c) the second thin film is pierced, and the reagent solution is released from the cavity into the microfluidic channels, and reaction wells.

The pre-loaded biochip is prepared for ready to use. Therefore, the reagents, such as enzyme labeled antibody, should be stable for a long period (1–2 years or longer at room temperature). In their liquid form, many biological reagents are unstable, biologically and chemically active, temperature sensitive, and chemically reactive with one another. Because of these characteristics, the chemicals may have a short shelf life, may need to be refrigerated, or may degrade unless stabilized. Therefore some of reagents are preferred to be stored in the dried form. One of dry reagent preparation methods is lyophilization, which has been used to stabilize many types of chemical components used in-vitro diagnostics. Lyophilization gives unstable chemical solutions a long shelf life when they are stored at room temperature. The process gives product excellent solubility characteristics, allowing for rapid liquid reconstitution. The lyophilization process involved five stages: liquid—frozen state—drying—dry—seal. The technology that allows lyophilized beads to be processed and packaged inside a variety of containers or cavities. In the case when dry reagents are involved, the chip (shown in FIG. 4) has a four-layer composition: a reagent buffer layer 51, a dry reagent layer 52, a microchannel layer 31, and a reaction well layer 32. The reagent buffer layer with its patterned microwells allows for the storage of liquid form of reagents buffer 50 in individual wells. Buffer solutions are stable for a long period time. The dry reagent layer contains dry reagent 54 in the dry reagent cavity 55 for rapid liquid reconstitution. When the actuator engages with the micro cap assembly, it pushes the pin downward. The pin pierces through the first thin film 53, dissolves the dry reagent into buffer solution. Then the second thin film 56 is pierced, and the stopper is continuously depressed downward to the bottom of the cavity and forces the reagent mixture into the microchannel.

Figure 5:
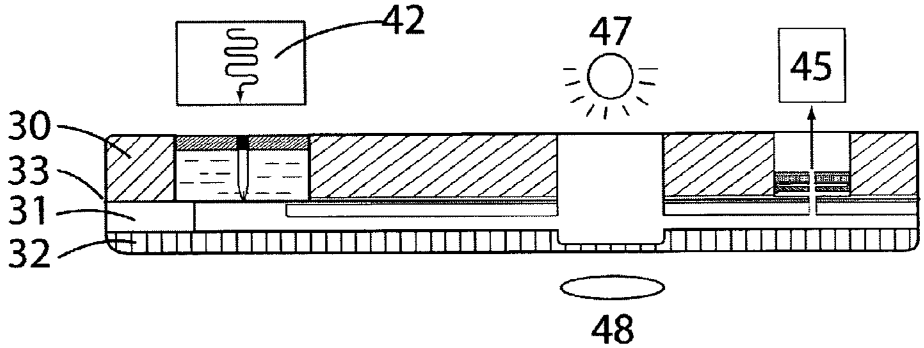
FIG. 5 shows the schematic diagram of chip analysis apparatus including a pressure-driven microactuator, vacuum line, and optoelectronic components.

The analysis apparatus (as shown in FIG. 5) includes a microactuator 42, vacuum line 45, detector 48, electronics, and microprocessor for protocol control and data processing. A linear actuator is built with a motor operated lead screw that provides for liner movement force. The linear actuator bas a 5~10 mm travel distance to press the micro cap assembly to break the sealing film and push liquid into the microfluidic channel. For certain applications, such as the enzyme-linked immunosorbent assay (ELISA) or fluorescence assay, a light source 47 can be implemented. No external light source is required for chemiluminescence or bioluminescence detection. The detector is one of the key elements that define the detection limit of the system. Depending on the sensitivity requirement, many detectors can be used. Optical detector, photodiode or photomultiplier tube (PMT). measures the change of absorption, fluorescence, light scattering, and chemiluminescence due to the probe-target reactions. The photon counting photomultiplier tube has a very high amplification factor. This detector incorporates an internal current-to-voltage conversion circuit, and is interfaced with a microprocessor unit that controls the integration time. This detector has a very low dark count and low noise. The detector is packaged as part of a light tight compartment and is located either at the bottom or top of the transparent reaction well. One detector is sufficient to scan all reaction wells on the rotational stage. A collecting lens can he used to improve light collection efficiency. Arrangement of the reaction wells should minimize cross talk signals. A narrow baud optical filter ensures detection of luminescence. The output of the detector is interfaced to a notebook computer or a digital meter. The optical signal corresponds to an analyte concentration.

Figure 6:
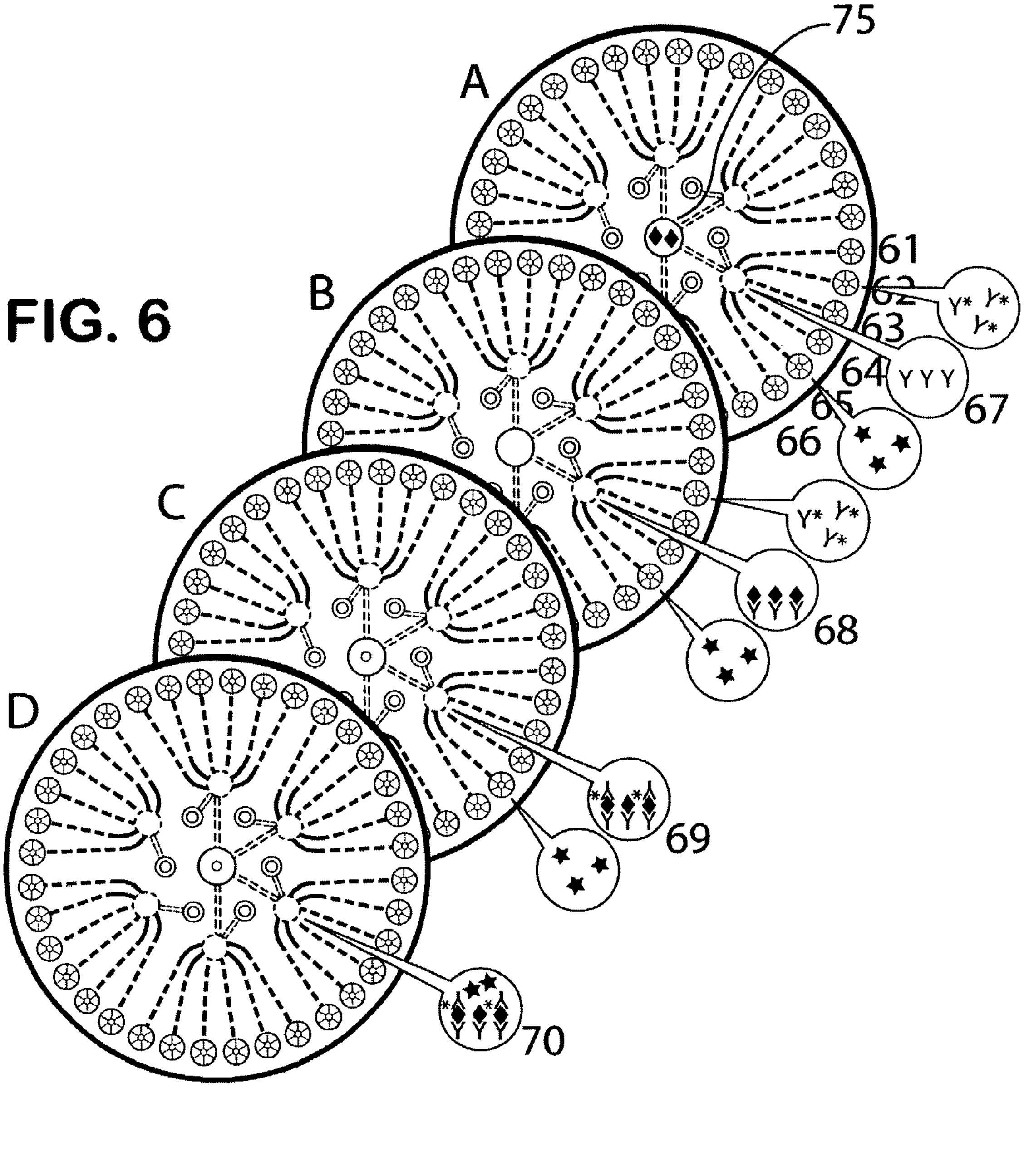
FIG. 6 shows an example of self-contained chip for chemiluminescence-based sandwich immunoassay protocol. (A) Before and (B) after deliver the sample to the reaction wells; (C) Wash away the unbound, and deliver the label conjugates; (D) Wash away the unbound, and deliver the luminescent substrate.

The microfluidic biochip can be used for automating a variety of bioassay protocols, such as absorption, fluorescence, ELISA, enzyme immunoassay (EIA), light scattering, and chemiluminescence for testing a variety of analytes (proteins, nucleic acids, cells, receptors, and the like) tests. The biochip is configured and designed for whole blood, serum, plasma, urine, and other biological fluid applications. The assay protocol is similar to that manually executed by 96-well microplates as described in U.S. Pat. No. 4,735,778. Depending on the probe use in reaction wells, the chips have the ability to react with analytes of interest in the media. The biochip is able to detect and identify multiple analytes or multiple samples in a very small quantity. The probes can be biological cells, proteins, antibodies, antigens, nucleic acids, enzymes, or other biological receptors. Antibodies are used to react with antigens. Oligonucleotides are used to react with the complementary strain of nucleic acid. For example, for chemiluminescence-based sandwich immunoassay (FIG. 6), the reagent cavities are preloaded with pre-determined amounts of washing solutions 61, 63, 64, label conjugates 62, and luminescence substrate 65. The reaction well is immobilized with probes or capture molecules 67 on the bottom of the surface or on solid supports, such as latex beads or magnetic beads. There are many immobilization methods including physical and chemical attachments; they are well known to those who are skilled in the art. Once a sufficient sample 75 is delivered to the reaction well, then the apparatus will automatically perform the following steps:

1. Let the sample or target incubate in the reaction well for approximately 5–10 minutes to form probe-target complex 68, then activating the vacuum line to remove the sample to the waste reservoir.
2. Dispense washing solution from a reagent cavity to the reaction well; then remove the unattached analyte or residual sample from the reaction well to the waste reservoir.
3. Move the label conjugate from the reagent cavity to the reaction well and incubate it; then remove the unattached conjugate to the waste reservoir.
4. Wash the reaction sites two or three times with washing solutions from reagent cavities to remove unbound conjugates; then remove the unattached conjugate to the waste reservoir.
5. Deliver chemiluminescence substrate solution 64 to the reaction well.
6. The reaction site will start to emit light only if the probe-target-label conjugate complex 69 formed. The signal intensity is recorded. The detector scans each reaction well with an integration time of 1 second per reading.

Chemiluminescence occurs only when the sandwich immuno-complex 69 ((e.g. Ab-Ag-Ab*), positive identification) is formed. The labeling enzyme amplifies the substrate reaction to generate bright luminescence 70 for highly sensitive detection and identification.

The claim of the invention is:

1. A self-contained disposable microfluidic biochip for performing multi-step reactions comprising:

a multi-layered body structure comprising plurality of layers, including a first layer defining a plurality of reagent cavities and at least second layer defining a plurality of reaction wells connected via microfluidic channels;

said reagent cavities respectively storing a plurality of reagents, wherein a seal is provided between the reagent cavities in the first layer and the microfluidic channels in the second layer;

said seal comprising a separate thin film located at the bottom of each reagent cavity to prevent escape of fluids through said microchannels; and said thin film being breakable and allowing said reagents to be released sequentially into at least one of said microfluidic channels and said reaction wells one at a time;

an integrated micro cap assembly located within each said reagent cavity comprising a pin for puncturing said thin film and a stopper slidable in each said reagent cavity to press a respective one of said reagents into said microfluidic channels;

said reaction wells, allowing sample input, and allowing said multi-step reactions to occur by removing away a sequence of said reagents.

2. The biochip defined in claim 1, wherein said body structure is formed by bonding multiple layers of plastic materials.

3. The biochip defined in claim 1, wherein said microfluidic channels have a dimension between 0.5 μm and 2 mm in cross section.

4. The biochip defined in claim 1, wherein one of said reagents is selected from a group consisting of buffer solutions, labeling substances, proteins, nucleic acids and chemicals.

5. The biochip defined in claim 1, wherein said reaction wells are facilitated with biological probes.

6. The biochip defined in claim 5, wherein one of said biological probes is selected from a group consisting of proteins, nucleic acids, receptors, and cells.

7. An analysis apparatus comprising a biochip defined in claim 1, and further comprising:

(a) a microactuator, positioned relative to each of said reagent cavities, to apply downward pressure to said micro cap assembly in each of said reagent cavities;

(b) a vacuum line positioned relative to at least one reaction well to remove residual reagent out of said reaction well; and (c) a detector located either above or below said reaction well for detecting optical signal generated in said reaction well.

8. The analysis apparatus defined in claim 7, further comprising a microprocessor for controlling said microactuator, said vacuum line, and said detector.

9. The analysis apparatus defined in claim 7, wherein said body structure is formed by bonding multiple layers of plastic materials.

10. The analysis apparatus defined in claim 7, wherein said microfluidic channels have a dimension between 0.5 μm and 2 mm in cross section.

11. The analysis apparatus defined in claim 7, wherein one of said reagents is selected from a group consisting of buffer solutions, labeling substances, proteins, nucleic acids and chemicals.

12. The analysis apparatus defined in claim 7, wherein said reaction wells are facilitated with biological probes.

13. The analysis apparatus defined in claim 12, wherein one of said biological probes is selected from a group consisting of proteins, nucleic acids, receptors, and cells.

14. The biochip defined in claim 1, wherein the second layer comprises a first sub-layer defining the microchannels and a second sub-layer defining the reactions wells.

15. A method of performing multi-step reactions comprising:

providing a biochip as defined in claim 1;

providing a sample in at least one reaction well;

activating the microcap assembly at a selected number of reagent cavities in a desired sequence, to deliver selected reagents into said at least one reaction well in a desired sequence; and reacting said sample and said selected reagents in said at least one reaction well.

16. A self contained disposable microfluidic biochip for performing multi-step reactions, comprising:

a body comprising a layered structure, including:

a first layer that comprises a plurality of reagent cavities each containing a reagent, a second layer that comprises at least one reaction well in fluid communication with the plurality of reagent cavities, and a separate layer of a sealing material disposed between the first layer and the second layer,which retains the reagent in each reagent cavity, and which is breakable at each regent cavity to permit flow of reagent into the reaction well, wherein the first layer, the sealing layer and the second layer are bonded together to form the layered structure; and a microcap assembly slidably received in each resent cavity, the microcap assembly comprising a stopper and a pin extending from the stopper towards the layer of sealing material, wherein the pin punctures the layer of sealing material when the stopper is pressed towards the layer of sealing material.

17. The biochip defined in claim 16, wherein the seal layer extends to the plurality of reagent cavities.

18. The biochip defined in claim 16, wherein the second layer further defines a network of microchannels extending from the reaction well to the layer of sealing material below the respective reagent cavities.

* * * * *